United States Patent [19]

Basin et al.

[11] Patent Number: 5,296,025
[45] Date of Patent: Mar. 22, 1994

[54] PROCESS AND DEVICE FOR PREPARING AN ASPHALT MIX

[75] Inventors: Gerard Basin, Clermont; Patrick Le Breton, Liancourt, both of France

[73] Assignee: Isover Saint-Gobain, Courbevoie, France

[21] Appl. No.: 864,354

[22] Filed: Apr. 6, 1992

[30] Foreign Application Priority Data

Apr. 18, 1991 [FR] France .................... 91 04776

[51] Int. Cl.⁵ .......................................... C09D 195/00
[52] U.S. Cl. ................................................. 106/282
[58] Field of Search ........................................ 106/282

[56] References Cited

U.S. PATENT DOCUMENTS 4,613,376  9/1986  Nilsson et al. ............... 106/282

FOREIGN PATENT DOCUMENTS 2625758  7/1988  France .

Primary Examiner—David Brunsman
Attorney, Agent, or Firm—Oblon, Spivak, McClelland, Maier & Neustadt

[57] ABSTRACT

In a process for preparing asphalt mixes charged with fibrous materials, the fibrous materials are introduced directly and continuously into the liquid asphalt in a drum, before or after contacting of the liquid asphalt with inert materials.

12 Claims, 5 Drawing Sheets

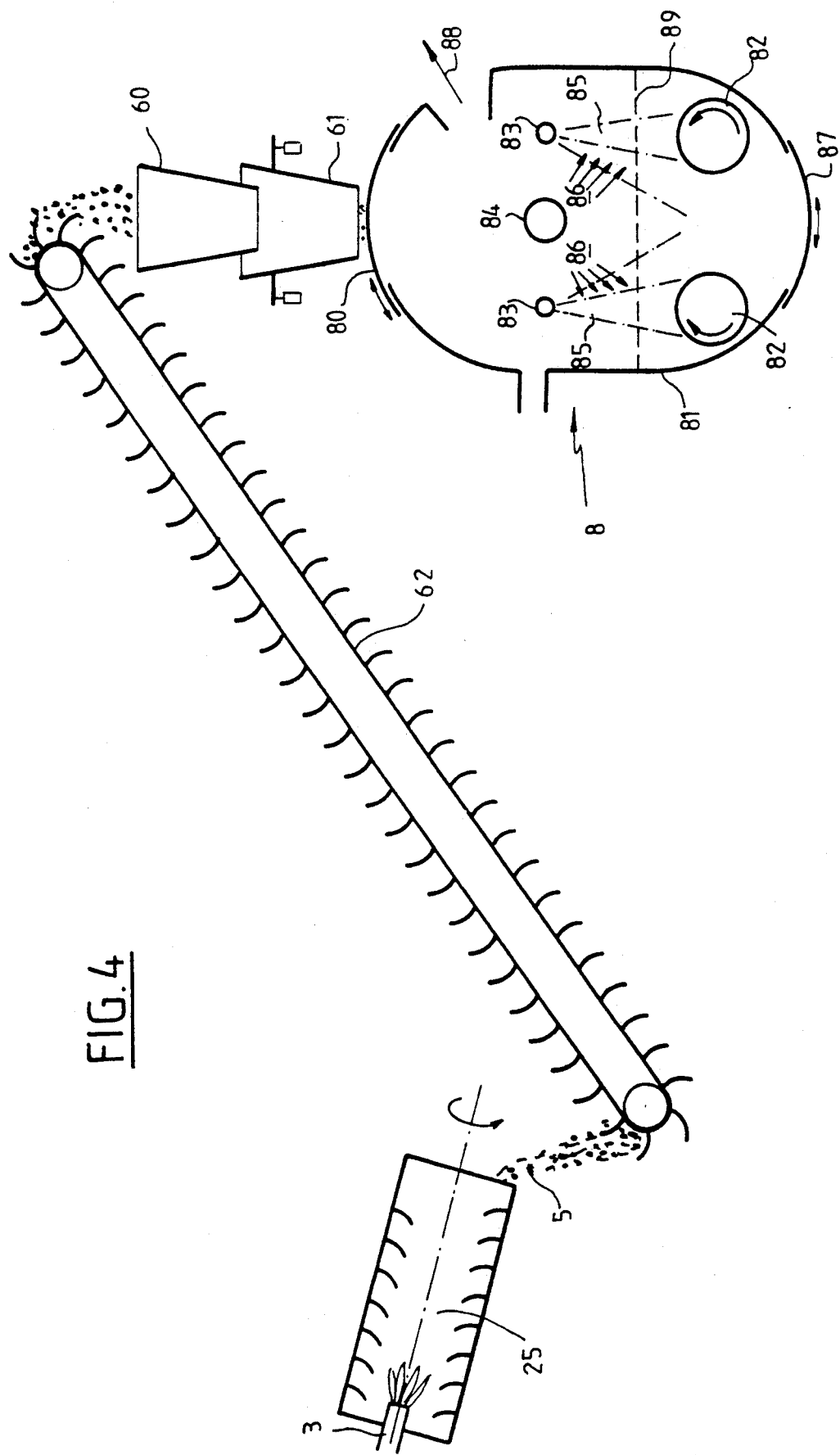

PROCESS AND DEVICE FOR PREPARING AN ASPHALT MIX

BACKGROUND OF THE INVENTION

1. Field of the Invention

This invention relates to a process and a device for preparing an asphalt mix.

2. Description of the Related Art

European patent EP 0,455,553 A discloses reinforcing asphalt with fibers for the coating of inert materials such as mineral pieces of various grain sizes, especially for road coatings.

The asphalts are used, among others things, for coating surfaces to make them fluid tight as in the case of flat roofs or vertical walls or for roads. Asphalts are almost never used in their pure state to form a water-permeable layer of a road since their performance at low and high temperatures is inadequate, so that they would provide fragile and brittle coatings in freezing weather and would become fluid under the effect of heat.

To improve the behavior of asphalts and especially asphalt mixes, and thus to broaden the range of temperatures where they can be used, various substances are added to the asphalts, such as fibers whose introduction is ordinarily performed in a batch manner.

Thus, European patent EP 0,055,233 B discloses a batch technique to prepare several tons of mixes by mixing inert materials such as gravel at a given temperature with the asphalt charged with mineral fibers at another precise temperature.

This technique is suitable only for the preparation of small quantities. Furthermore the precision that it requires in weighing and in controlling temperatures makes using it difficult. Furthermore, no device for using the technique is known.

SUMMARY OF THE INVENTION

The present invention has as an object to make possible the preparation of an asphalt mixture intended for the coating of inert materials for improved performance. Another object of the invention is to provide a device which makes it possible to prepare a mix comprising inert materials, asphalt and fibers introduced continuously, whether the coating process is of the continuous or batch type.

A further object is to provide a process for preparing an asphalt mix that prevents the deterioration of the fibrous materials and makes possible their homogeneous mixing in the asphalt. This object is attained by the fact that the fibrous materials are introduced directly and continuously into the liquid asphalt.

According to another feature, the process comprises the steps of drying, heating and mixing of the inert materials; independently, continuously introducing fibrous materials at a controlled rate in the current of liquid asphalt to form a charged liquid binder, before it is put in contact with the inert materials, and mixing the inert materials and the charged liquid binder.

According to another feature, before the inert material is added, the fibrous material is prepared from mineral fibers having a Micronaire at most equal to 7 under 5 grams and oiled with a non-ionic finish, and nodules are formed by passing the fibers through a plate with holes having an average dimension of 6 to 10 mm so as to obtain at least 75% of the fibers with a length less than 0.5 mm.

According to another feature, the oil finish preferably has an amine oxide base of a fatty acid and particularly dimethyl-alkyl-amine oxide.

According to another feature, the process comprises the steps of drying, heating and mixing of the inert materials, mixing the asphalt with the inert materials to constitute a liquid mix, and continuously introducing fibrous materials at a controlled rate into the liquid mix.

In a variant of this latter process, before the introduction of the fibrous material, mineral fibers with a Micronaire at most equal to 7 under 5 grams and oiled with a non-ionic finish are used to form the fibrous material, followed by formation of nodules of fibrous material by passing of the fibers through a plate with holes with average dimension of 6 to 10 mm so as to obtain at least 75% of the fibers with a length less than 0.5 mm.

The oil finish has an amine oxide base of a fatty acid and particularly dimethyl-alkyl-amine oxide.

Another object is to provide a device for continuous feeding of the fibers making it possible to use the coating process continuously or in a batch manner.

This object is attained, in a first embodiment, by a rotating drum with a flame zone and a liquid asphalt distribution device, in which currents of liquid asphalt and sprays of fibrous material intersect to provide the continuous contact of the fibrous material with the liquid before any contact of the liquid binder with the inert material.

The device for preparing asphalt may instead comprise a drying drum, a system for distribution of liquid asphalt and a mixer, in which a system of continuous distribution of fibrous materials assures their contact with the asphalt after contact of the liquid asphalt with the inert material.

According to another feature, the device for distribution of fibrous materials is fed by a device for unpacking, metering and pneumatic transport, assuring the control of the flow rate of fibrous material.

According to another feature, the device for unpacking, metering and pneumatic transport comprises a loosening device, a carder, a volumetric metering apparatus and a source of air under pressure.

In a variant, the loosening device comprises blades composed of a sharp-edged arm equipped at its end with an orientable perpendicular pin.

According to another feature, the elements that make up the unpacking device have independently adjustable speeds and furthermore, upstream from the unpacking device, in a variant, an anti-return device has been installed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows an installation for batch preparation of mixes according to the invention;

FIG. 7 shows a mixing box that can be used in the installation of FIG. 1 or FIG. 4.

DETAILED DESCRIPTION OF THE PREFERRED EMBODIMENTS

Figure 1:
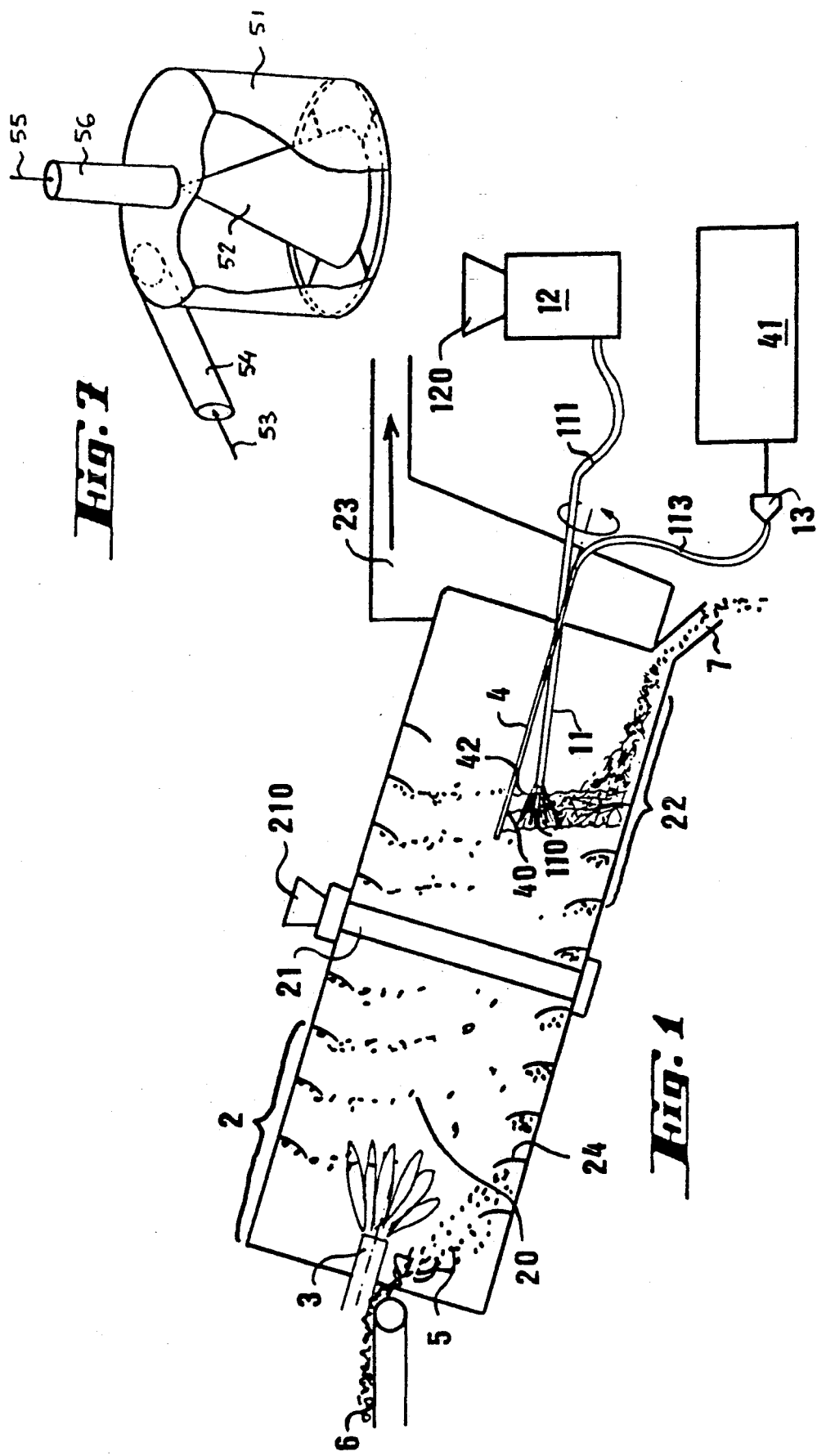
FIG. 1 shows a diagrammatic view of a device for continuous preparation of an asphalt mixture according to the invention.

The device according to a first embodiment of the invention shown in FIG. 1 comprises a coating drying drum having a drum part 2 in which inert aggregates are introduced by a conveyor belt 6. This rotating drum makes it possible to dry the inert materials 5 and heat them by causing a hot gas current provided by a burner 3 to circulate perpendicular to their direction of movement when they fall after having been carried to the high part of the drum by blades 24. The hot gases filled with dust particles are removed by a hood 23 through a filter to recover the dust particles before removal of the gases by a fan to a chimney. Burner 3 is located in the axial part 2 of the coating drying drum. Downstream from the flame zone of burner 3 is a curtain 20 of inert material raised and dropped in blades 24. A pipe 4 ends with holes 40 in coating zone 22 for delivery of the hot liquid asphalt supplied by a reservoir 41 via pump 13. Generally, the device is provided with a recycling ring 21 for the introduction of recovery mixes through a funnel 210. This ring 21 is located downstream from the burner and upstream from asphalt delivery holes 40. Asphalt delivery holes 40 make it possible for the asphalt to flow in currents 42, which produces a homogeneous distribution of the asphalt over the inert material which come in contact with the currents 42 and which move toward outlet hopper 7. Then, after a final mixing, the inert materials discharged from the hopper 7 are lifted by a bucket conveyor, not shown, to a storage silo.

According to the invention, a nozzle 11 for delivery of fibers also comes out near the distribution zone of the asphalt. This nozzle 11 terminates with an end that scatters the fibers in the form of a jet 110 which intersects currents 42 of asphalt so that the asphalt-fibers association to form a charged liquid binder is performed before any contact with inert materials 5. Pipe 111 for transferring the fibers has a relatively large section, which makes possible a good "dilution" of the fibers in the current of air and prevents any agglomeration during their entrainment through the feed pipe to the spray nozzle. Transfer pipe 111 extends from a device 12 for unpacking and pneumatic transport of the fibers in an air current such as, for example, the one disclosed in French patent FR 2 557 817, thereby making it possible to convey, via a blower, the fibers inside pipe 111. This pipe can be equipped with an anti-return device, not shown, which prevents dust particles, the "fines," contained in the installation from being driven back toward device 12 when the introduction of the fibers is stopped.

In the embodiment shown in FIG. 7, the mixing of the fibers and the liquid asphalt is performed in a mixing box before reaching the drum. This box which is described in U.S. Pat. No. 4,211,490 is a cylinder 51 with a vertical axis whose diameter and height are both about 50 cm. The box, which has no bottom, comprises a coaxial cone 52 connected rigidly to the walls of the box. The fibrous materials arrive at 53 by a tangentially connected pipe 54 with a diameter for example between 80 and 120 mm, this pipe being connected to fiber delivery pipe 111. The fibers penetrate tangentially at the top part. The asphalt arrives at 55 in the axis of cone 52 via a pipe 56 connected to asphalt delivery pipe 113.

In the case of the mineral fibers, they will advantageously be in the form of nodules, preferably according to the technique for preparation of nodules described in European patent application EP 0,455,553. It makes possible the conversion of the layer of oiled mineral fibers into nodules ready to be incorporated into the asphalt. They are then mixed in a proportion by weight between 0.5 and 20% in relation to the asphalt. These nodules consist of mineral fibers having a Micronaire before any chemical or mechanical treatment, measured according to the standards DIN 53941 or ASTM.D. 1448, which is at most equal to 7 under 5 grams. The fibers are ground and cut by the blades of the device so that 75% have a length less than 500 microns; then they are converted into nodules which make it possible to facilitate the introduction and dispersal of the fibers in the asphalt.

Figure 5:
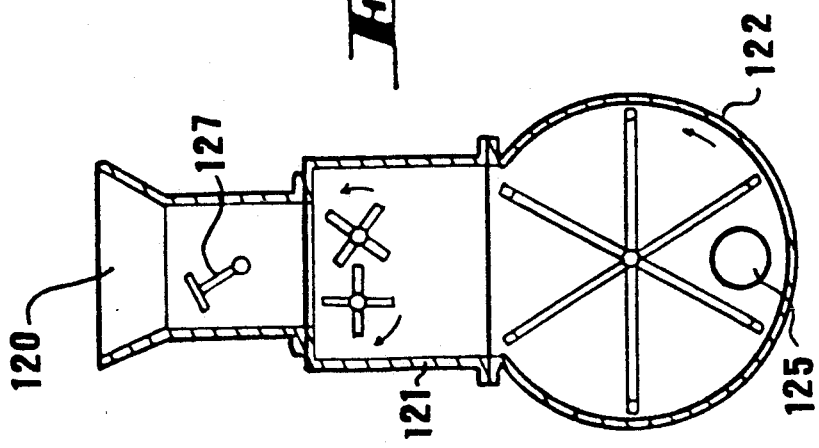
FIG. 5 shows the device for unpacking and pneumatic transport for using the processes of the invention.

Device 12 for unpacking and pneumatic transport is fed with the fibers via a hopper 120 and in this way makes it possible to obtain, after mixing with the asphalt and without handling, an asphalt mixture having the required properties. Device 12 such as the one described in French patent 2,557,817 is shown in FIG. 5. It comprises essentially a loosening device 127 preceding a carder 121 which feeds a metering device such as a paddle valve 122, and a turbine with controlled flow, not shown, which provides at opening 125 the air necessary for the transfer of the fibers.

The fibrous materials can be introduced in bulk, for example via a silo located above device 12. This arrangement has an advantage in the case of installations that are stationary or not very mobile, but in the majority of cases loosening device 127 will be supplied with sacks filled with packed nodules having a base of prepared mineral fibers. In the sacks, the overlapping of the compressed nodules is considerable and for this reason it has been found useful to replace the blades of loosening device 127 with two new elements: a sharp-edged arm 128 which serves as a knife and is able to cut the agglomerates of nodules via its sharp edge oriented in the plane of its path, and at the end of the knife, a symmetrical pin 129 extending perpendicular to the arm which can be set at various orientations so as either to push the nodules back toward the outlet of loosening device 127 and direct them toward carder 121 or keep the fiber in the loosing zone long enough for the nodules to be separated from one another.

Varied proportions between the fibers and the asphalt are obtained by independent adjustments of the speed of rotation of loosening device 127, the speed of rotation of carder 121, the speed of rotation of paddle valve 122 and the delivery o air as a function of the delivery of asphalt pump 13.

Such a device makes it possible to put the fibers in contact with the asphalt to prevent a dry mixing of the inert materials and fibers. Actually, the conventional devices often provided for performing a dry premixing of the inert materials with the fibers, before mixing the whole with the liquid asphalt, which thereby caused a deterioration of the fibers and their wear, bringing about the necessity of increasing the amount of fibers to obtain the same physical characteristics in the final product. In the continuous production technique, as taught by French patent 2,625,758, the fibrous materials such as asbestos or cellulose were brought in the form of sacks introduced individually into recycling ring 21 upstream from the device for spraying the asphalt, through hopper 210. The fibrous materials were therefore being deposited on the heated inert materials with which they were dry mixed until the introduction of the asphalt. This technique required considerable manpower and, furthermore, the dispersal of the fibrous materials was most often poor, agglomerates of fibers being coated with asphalt on the outside before having been dispersed. On the other hand, the method of the invention makes possible an excellent dispersal even when the nodules of mineral fibers have been packed in sacks up to specific masses of 150 kg/m$^3$.

A device such as the one that has just been described makes it possible, for example, to work 260 tons of inert materials per hour by mixing them with 15 tons of 60/70 asphalt and 900 kilos of nodules of mineral wool fibers produced according to the process of European patent application EP 0,455,553. This makes it possible to produce about 276 tons per hour of draining mix by decreasing the consumption of fibrous product, for example in a ratio of 3 compared with the asbestos introduced in the conventional manner, while saving on manpower.

Figure 2:
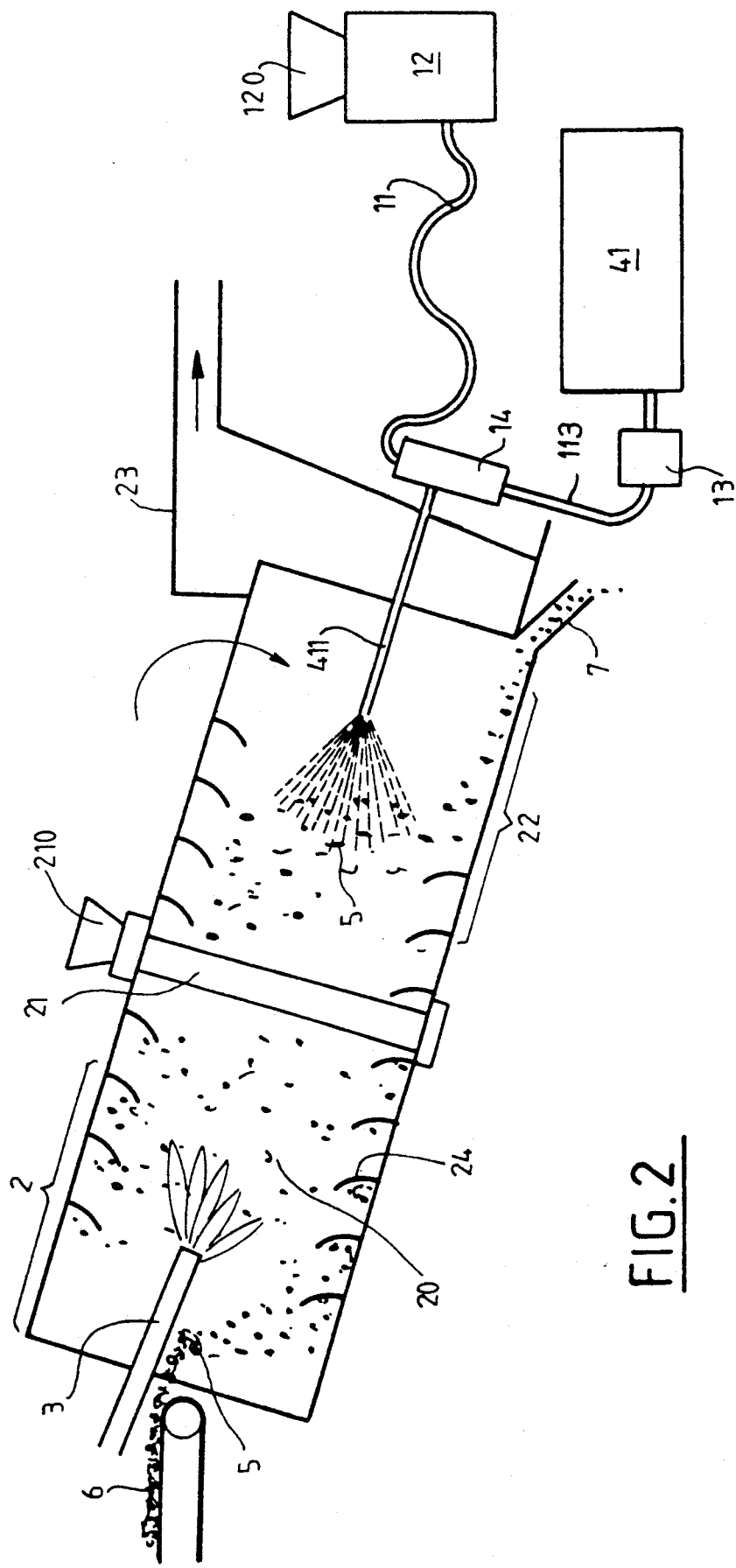
FIG. 2 shows a diagrammatic view of a second variant device for continuous preparation with premixing of an asphalt mixture according to the invention.

A second embodiment which still relates to the continuous technique is shown in FIG. 2 in which the same elements carry the same reference numbers. The device comprises a single pipe 411 for transporting a liquid asphalt-fiber premixture made in an independent heating mixer 14. The mixer 14 receives on one side the asphalt coming from pump 13 via pipe 113 and on the other side the fibers coming through pipe 111 of device 12 for unpacking and pneumatic transport.

The second embodiment exhibits the advantage of being simpler to use because it does not require adjustment. Like the technique using the mixing box in the first embodiment, this embodiment also prevents the dangers of sucking the fibers toward the chimney.

Figure 3:
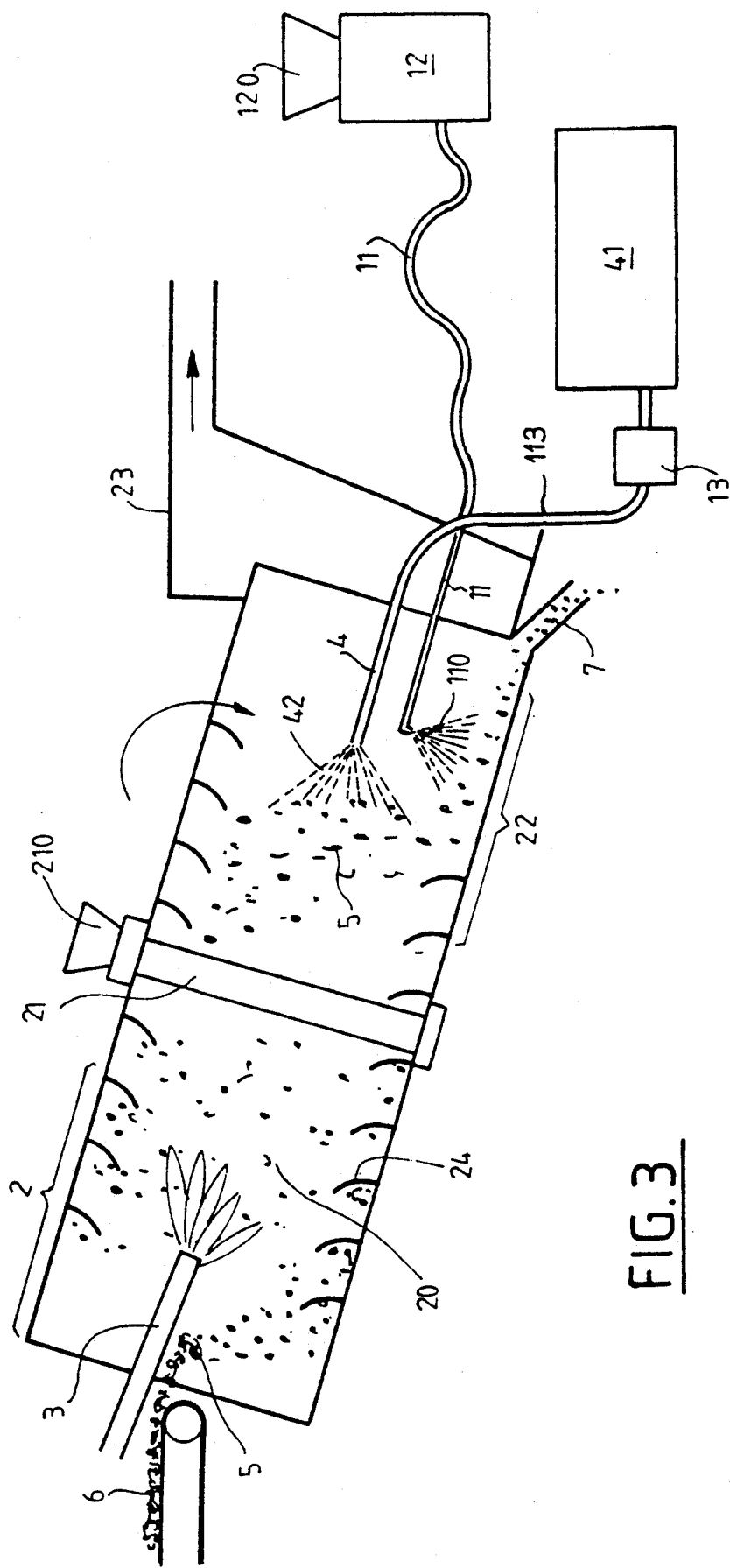
FIG. 3 shows an installation for continuous production of the same type but in a third variant.
Figure 6:
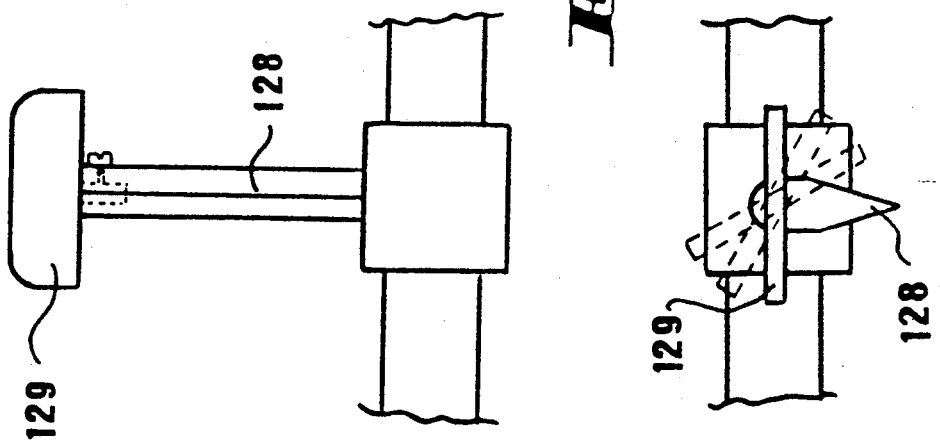
FIG. 6 illustrates an embodiment of the blades of the loosening device.

According to another embodiment of the process, the fibers are introduced at the downstream end of the mixer, just before the outlet of the rotating drum. This is shown in FIG. 3 whose elements identical with the installation of FIG. 1 carry the same references and whose sole difference consists in that asphalt distribution nozzle 4 is located upstream from fiber spraying nozzle 11. Fiber spraying nozzle 11 is oriented so that the spraying occurs in a radial direction in relation to the axis of rotation of the installation while the asphalt distribution nozzle is oriented so that the distribution occurs upstream.

A variant of an installation for batch production of asphalt mix charged with fibrous material is shown in FIG. 4 in which a drying drum 25 is driven in rotation along an inclined axis and comprises a burner 3 in its upstream part by which the inert materials are introduced to be dried and heated and then deposited on a conveyor 62 which takes them away to a surge hopper 60 which feeds a weighing hopper 61 located above mixer 8. Mixer 8 has mixing arms 82 with horizontal axes and an inlet 80 located at its upper part for inert materials 5. An outlet 87 is located at the lower part of the mixer to deliver the mix whose upper level is represented by broken line 89. The asphalt is introduced above the two mixing arms 82 by two ramps 83. A distributor 84 located at the same level and between the two ramps 83 distributes the fibers in jets 86.

The device thus described operates according to the following process. Once the desired quantity of inert material is introduced and the dry mixing is begun, three variants of operation are possible According to a first variant, the liquid asphalt is simultaneously introduced by ramps 83 to send forth jets 85 of asphalt and at the same time distributor 84 sends forth jets 86 of fiber. Under these conditions, the asphalt comes in contact with the fibers before contact with the inert materials.

A variant of this first operating method consists in using the mixing box of FIG. 7 to produce a homogeneous mixing of the fibers and the asphalt, which mixture is then introduced into the mixer 8.

According to a second operating method, the asphalt alone is first introduced by ramps 83, is mixed with inert material to form a liquid mix and then the fibers are continuously introduced.

In a third variant of the batch coating process, an asphalt-fiber premixer such as premixer 14 of FIG. 2 may be used. In this case, only ramps 83 of FIG. 4 to introduce the binder are necessary.

In all the variants described, the machine for supplying fibers is identical with the one described in connection with FIG. 5. Machine 12 makes it possible to control the adjustments of the flow rates by weight of fibers. In continuous mode, it provides a constant delivery of fibers. In batch mode, within sequences, it makes it possible to deliver the fibers continuously, which facilitates their dispersal in the asphalt.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for preparing an asphalt mix, comprising the steps of:
   drying, heating and mixing inert materials;
   continuously introducing a fibrous material at a controlled rate into a current of liquid asphalt to form a charged liquid binder;
   combining the charged liquid binder with the inert materials; and
   mixing the charged liquid binder and inert materials, wherein said introducing and combining steps together comprise at least one step of spraying a material including fibrous material on the inert materials.

2. The process of claim 1 including the step of forming the fibrous material from mineral fibers having a Micronaire not greater than 7 under 5 grams and a non-ionic oiled finish, by passing the mineral fibers through a plate with holes having an average dimension of 6 to 10 mm, thereby forming nodules in which at least 75% of the fibers have a length less than 0.5 mm.

3. The process of claim 2, wherein the non-ionic oiled finish comprises an amine oxide base of fatty acid.

4. The process of claim 3, wherein said amine based fatty acid comprises dimethyl-alkyl-amine oxide.

5. The process of claim 1 wherein said introducing step comprises spraying the fibrous material so as to intersect the current of liquid asphalt.

6. The process of claim 1 wherein said combining step comprises spraying the charged liquid binder onto the inert materials.

7. The process for preparing an asphalt mix, comprising the steps of:
   drying, heating and mixing inert materials;

mixing asphalt with the inert materials to form a liquid mix; and continuously spraying a fibrous material at a controlled rate into the liquid mix.

8. The process of claim 7 including the step of forming the fibrous material from mineral fibers having a Micronaire not greater than 7 under 5 grams and a non-ionic oiled finish, by passing the mineral fibers through a plate with holes having an average dimension of 6 to 10 mm, thereby forming nodules in which at least 75% of the fibers have a length less than 0.5 mm.

9. The process of claim 8, wherein the non-ionic oiled finish comprises an amine oxide base of fatty acid.

10. The process of claim 9, wherein said amine based fatty acid comprises dimethyl-alkyl-amine oxide.

11. The process of claim 7, wherein said mixing step comprises spraying asphalt onto said inert materials.

12. The process of claim 11 wherein said continuously spraying step comprises spraying the fibrous material radially onto the liquid mix.

* * * * *